United States Patent [19]
Smeulers

[11] 3,717,728
[45] Feb. 20, 1973

[54] ADJUSTING CIRCUIT FOR A CHROMINANCE SIGNAL AMPLIFIER IN A COLOR TELEVISION RECEIVER USING A DIFFERENTIAL AMPLIFIER SUITABLE FOR AN INTEGRATED CIRCUIT

[75] Inventor: Wouter Smeulers, Emmasingel, Eindhoven, Netherlands

[73] Assignee: U.S. Philips Corporation, New York, N.Y.

[22] Filed: April 8, 1971

[21] Appl. No.: 132,278

[30] Foreign Application Priority Data

April 28, 1970 Netherlands ........................7006144

[52] U.S. Cl. .......................178/5.4 AC, 178/69.5 CB
[51] Int. Cl. ..............................................H04n 9/46
[58] Field of Search.......178/69.5 CB, 5.4 AC, 5.4 R, 178/5.4 CK

[56] References Cited

UNITED STATES PATENTS

| | | | |
|---|---|---|---|
| 2,880,266 | 3/1959 | Parker | 178/69.5 CB |
| 2,908,748 | 10/1959 | Macouski | 178/5.4 AC |
| 2,913,519 | 11/1959 | Macouski et al. | 178/5.4 CK |
| 3,342,930 | 9/1967 | Kool | 178/5.4 R |
| 3,558,804 | 1/1971 | Janssen et al. | 178/5.4 AC |

*Primary Examiner*—Robert L. Griffin
*Assistant Examiner*—Donald E. Stout
*Attorney*—Frank R. Trifari

[57] ABSTRACT

In a chrominance signal amplifier stage including a current branch circuit of the long-tailed pair type and a load resistor in one of the current branches from which a burst signal is obtained, the amplitude of this burst signal is rendered independent of a bias or control voltage active on a branch current by blocking current branches which are not connected to the load resistor.

2 Claims, 1 Drawing Figure

PATENTED FEB 20 1973 3,717,728
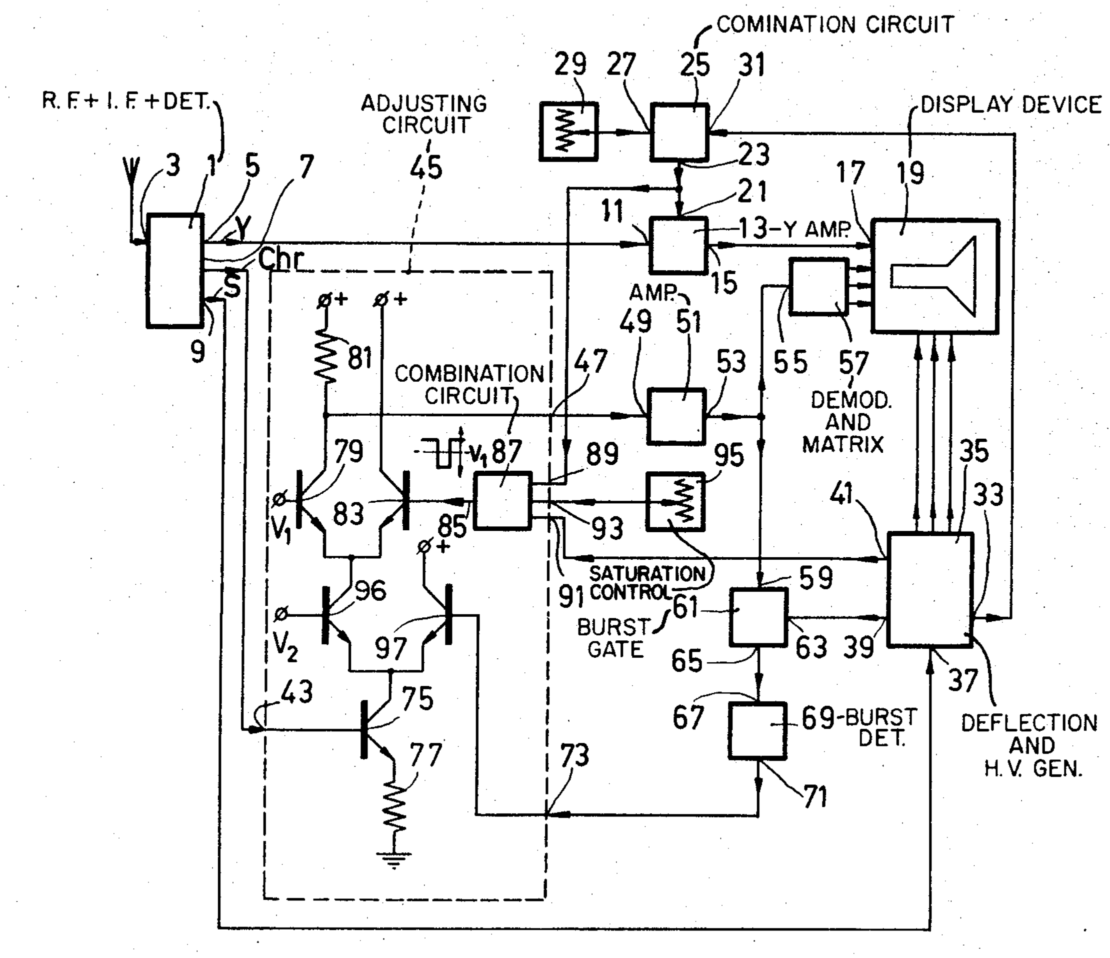
INVENTOR.
WOUTER SMEULERS
BY [signature]
AGENT

ADJUSTING CIRCUIT FOR A CHROMINANCE SIGNAL AMPLIFIER IN A COLOR TELEVISION RECEIVER USING A DIFFERENTIAL AMPLIFIER SUITABLE FOR AN INTEGRATED CIRCUIT

The invention relates to an adjusting circuit for a chrominance signal amplifier in a color television receiver by which a ratio between a picture content signal and a burst signal of a chrominance signal to be handled can be adjusted, which ratio is substantially independent of the amplitude of the burst signal and which adjusting circuit comprises a signal input, a signal output, a pulse signal input and an adjusting signal input.

A circuit of the kind described above is known from the U.S. Pat. No. 3,558,804 in which an attenuation circuit is arranged between the signal input and the signal output and has an attenuation dependent on an output voltage of a combination circuit coupled to the pulse signal input and the bias voltage input. The attenuation circuit includes a resonance circuit damped by a diode. The extent of attenuation of the circuit is dependent on the extent of conductance of the diode and this is determined by the output voltage of the combination circuit. During the occurrence of the burst signal the diode is blocked by a pulse signal applied to the pulse signal input and the attenuation is at a minimum.

This known circuit is less than suitable for use in integrated circuits due to the use of a tuned circuit.

The object of the present invention is to provide an adjusting circuit which is eminently suitable for use in integrated circuits.

According to the invention an adjusting circuit of the kind described in the preamble is characterized in that the signal input is coupled to the base of a first transistor whose collector is coupled to the emitter of a second and a third transistor, the second transistor having a collector which is connected through a load impedance to a supply voltage, which collector is furthermore coupled to the signal output while the pulse signal input and the adjusting signal input are each coupled to at least one of the bases of the second and third transistors.

In order that the invention may be readily carried into effect, an embodiment thereof will now be described in detail, by way of example, with reference to the accompanying drawing.

The single FIGURE shows by way of a non-detailed block diagram a color television receiver including an embodiment of an adjusting circuit according to the invention shown by way of a non-detailed principle circuit diagram.

An RF, IF and detection section 1 of the receiver has an aerial input 3, an output 5 to which a luminance signal Y is applied, an output 7 to which a chrominance signal Chr is applied and an output 9 to which a synchronizing signal S is applied.

The output 5 of the section 1 is connected to an input 11 of a luminance signal amplifier 13. An output 15 of the luminance signal amplifier 13 is connected to an input 17 of a picture display section 19. Furthermore a control signal input 21 of the luminance signal amplifier 13 is connected to an output 23 of a combination circuit 25. The combination circuit 25 is a simple resistive adder, such as formed by the resistors 38 and 42 in FIG. 1 of said U.S. patent. An input 27 of this combination circuit 25 is connected to a contrast adjusting circuit 29 and an input 31 is connected to an output 33 of a deflection current and EHT generator 35 an input 37 of which is connected to the input 9 of the section 1. The deflection and high voltage generator 35 can be as shown in U.S. Pat. No. 2,880,266, elements 28, 29, 124, 90, and 113 and their associated components.

The generator 35 provides a beam current limiting voltage for the output 33. Furthermore this generator provides vertical and horizontal deflection currents for the picture display section 19 and pulses to two outputs 39 and 41 which will be further referred to hereinafter.

The chrominance signal output 7 of the section 1 is connected to an input 43 of an adjusting circuit 45 according to the invention.

The adjusting circuit 45 has an output 47 which is connected to an input 49 of an amplifier 51. An output 53 of the amplifier is connected to an input 55 of a demodulation and matrix circuit 17, and to an input 59 of a burst gate 61.

The burst gate 61 has an input 63 which is connected to the output 39 of the generator 35 and to which a gating pulse is applied by this generator. During the occurrence of the gating pulse the burst gate 61 conducts and applies a burst signal to an output 65. The output 65 is connected to an input 67 of a detector 69 which converts a burst signal passed every time during the occurrence of a gating pulse into a direct voltage which appears at an output 71. The output 71 is connected to a control signal input 73 of the adjusting circuit 45 so that a control is present which attempts to maintain the amplitude of the burst signal at the output 53 of the amplifier 51 constant.

The adjusting circuit 45 includes a first npn-transistor 75 whose base is connected to the input 43 and whose emitter is connected to earth through a resistor 77. The output 47 of the adjusting circuit 45 is connected to the collector of a second npn-transistor 79, which collector is connected to a positive voltage through a load resistor 81.

The emitter of the second transistor 79 is connected to that of a third npn-transistor 83. The base of the second transistor 79 is connected to a voltage $V_1$, the base of the third transistor 83 is connected to an output 85 of a second combination circuit 87. This combination circuit can likewise be a simple resistive adder, as is shown in said U.S. Pat. No. 3,558,804.

The second combination circuit 87 has an input 89 which is also the adjusting signal input of the adjusting circuit 45 and is connected to the output 23 of the combination circuit 25. This adjusting signal input receives a voltage which is dependent on the contrast adjustment and the beam current. A second input 91 of the combination circuit 87 is also the pulse signal input of the adjusting circuit 45 and is connected to the output 41 of the generator 35. A third input 93 of the second combination circuit 87 is a second adjusting signal input of the adjusting circuit 45 and is connected to a saturation adjusting circuit 95.

The collector of the third transistor 83 is connected to a positive supply voltage.

The emitters of the second transistor 79 and the third transistor 83 are coupled through a fourth npn-transistor 95 to the collector of the first transistor 75.

The emitter of the fourth transistor 95 is connected to the collector of the first transistor 75 and to the emitter of a fifth npn-transistor 97. The collector of the fourth transistor 95 is connected to the emitters of the second and third transistors 79, 83 and the base is connected to a supply voltage $V_2$. The collector of the fifth transistor 97 is connected to a positive supply voltage and the base is connected to the control signal input 73 of the adjusting circuit 45.

The operation of adjusting circuit 45 is as follows: A chrominance signal applied to the base of the first transistor 75 and containing a burst and a picture content signal is applied in an amplified form by the collector to the emitters of the fourth and fifth transistors 95, 97. The current distribution between these transistors is controlled by the control signal at the control signal input 73. The portion of the current flowing through the fourth transistor 95 is applied through the collector thereof to the emitters of the second and third transistors 79, 83.

The current distribution between the second and third transistors 79, 83 is determined by the voltage difference between the bases of these transistors. As a result of the pulse signal applied to the input 91 of the combination circuit during the occurrence of the burst signal, this voltage difference is always such that the third transistor 83 is cut off. The entire current supplied by the fourth transistor 95 then flows to the second transistor 79 and provides a burst signal across the load resistor 81 which signal is independent of an adjustment of the contrast or saturation adjusting circuit 29 or 95.

During the occurrence of the picture signal in the chrominance signal to be handled the voltage difference between the bases of the second and third transistors 79, 83 may be influenced by the contrast adjusting circuit 29, the saturation adjusting circuit 95 and the beam current limiting voltage originating from the output 33 of the generator 35. A part of the current dependent on this voltage difference and being supplied by the fourth transistor 95 then flows through the second transistor 79 and produces a signal voltage across load resistor 81 which is dependent on the said values.

The signal occurring across the load resistor 81 then has a ratio between amplitude of the burst signal and that of the picture content signal of the chrominance signal which ratio is independent of the automatic gain control signal applied to the control signal input 73 and which is dependent on the total bias voltage applied through the second combination circuit 87, while the amplitude of the burst signal is not influenced by the last-mentioned bias voltage and is maintained substantially constant by the said automatic gain control.

Although, as described above, both the bias voltages and the pulse voltage were applied to the base of the third transistor 83, it is alternatively possible to apply one or more of these voltages to the base of the second transistor 79 in which in that case the variation must be of opposite polarity so as to achieve the same effect.

Optionally, the transistor pairs may each be shunted by a direct current combination pair or the adjusting or control levels may be balanced.

Furthermore, it is possible to omit the fourth and fifth transistors 95 and 97 and to cause the automatic gain control to be active on a stage preceding or following the adjusting circuit. The collector of the first transistor 75 is then connected to the emitters of the second and third transistors 79 and 83.

The circuit is eminently suitable for use in integrated circuits.

What is claimed is:

1. A circuit for adjusting the ratio between the chroma burst and the chrominance video amplitude of a composite chrominance television signal, said circuit comprising a chrominance signal input means adapted to receive said composite chrominance signal; first, second and third transistors each having emitter, base, and collector electrodes, said first transistor base being coupled to said input means, said first transistor collector being coupled to said second and third transistors emitters; a load impedance having a first end coupled to said second transistor collector and a second end adapted to be coupled to a voltage source; a pulse signal input means adapted to receive a pulse signal during the occurrence of said chroma bursts and coupled to at least one of said bases of said second and third transistors; a gain adjusting input adapted to receive a gain adjusting signal and coupled to at least one of the bases of said second and third transistors; and a signal output means coupled to said second transistor collector for providing an output signal comprising said composite chrominance signal, wherein the amplitude ratio of said burst and said chrominance video signal is a selected value independent of the amplitude of said chroma burst.

2. A circuit as claimed in claim 1 further comprising fourth and fifth transistors each having emitter, base and collector electrodes, said fourth and fifth transistors emitters being coupled together and to said first transistor collector, said fourth transistor collector being coupled to said first and second transistor emitters; and a control signal input coupled to at least one of the bases of said fourth and fifth transistors.

* * * * *